(12) United States Patent
Lin et al.

(10) Patent No.: US 7,837,395 B2
(45) Date of Patent: Nov. 23, 2010

(54) OPTICAL FIBER ADAPTER WITH SHUTTER MEMBER

(75) Inventors: I En Lin, Taipei (TW); Tomoyuki Mamiya, Marlboro, MA (US); Jyh Cherng Yang, Taipei (TW)

(73) Assignees: Protai Photonic Co., Ltd., Sinhuang (TW); Senko Advanced Components, Inc., Marlboro, MA (US)

( * ) Notice: Subject to any disclaimer, the term of this patent is extended or adjusted under 35 U.S.C. 154(b) by 0 days.

(21) Appl. No.: 12/421,077

(22) Filed: Apr. 9, 2009

(65) Prior Publication Data

US 2009/0226141 A1    Sep. 10, 2009

(30) Foreign Application Priority Data

Jan. 21, 2009    (TW)    ............... 98102199 A (51) Int. Cl.
G02B 6/00 (2006.01)
G02B 6/36 (2006.01)
G02B 6/38 (2006.01)

(52) U.S. Cl. .................. 385/58; 385/53; 385/65; 385/59; 385/60; 385/134; 385/136

(58) Field of Classification Search .......... 385/58–60, 385/134, 53, 56, 136
See application file for complete search history.

(56) References Cited

U.S. PATENT DOCUMENTS

2004/0062486 A1*   4/2004   Tanaka et al. ............... 385/55
2007/0230874 A1*  10/2007   Lin ............................. 385/53

* cited by examiner

*Primary Examiner*—Charlie Peng
*Assistant Examiner*—Jerry Blevins (57) ABSTRACT

An optical fiber adapter is provided. The adapter includes a plurality of walls which defines an accommodation room adapted for being coupled with an optical fiber connector. A protrusion in the accommodation room is disposed on one of the walls. The adapter further includes a shutter member having a first parallel portion, a second parallel portion substantially parallel to the first parallel portion and a connecting portion connecting the first and second parallel portions. The first and second parallel portions and the connecting portion together define a clamping portion. The clamping portion clamps the protrusion. An elastic shutter plate extends from the first parallel portion and into the accommodation room.

13 Claims, 8 Drawing Sheets

OPTICAL FIBER ADAPTER WITH SHUTTER MEMBER

CROSS REFERENCE TO RELATED APPLICATION

This application claims the priority benefit of Taiwan Patent Application Serial Number 098102199 filed Jan. 21, 2009, the full disclosure of which is incorporated herein by reference.

BACKGROUND OF THE INVENTION

1. Field of the Invention

The present invention relates to an optical fiber adapter, and more particularly, to an optical fiber adapter with a shutter member.

2. Description of the Related Art

Recently, the optical fiber has been widely used as signal transmission media because of its high bandwidth and low loss nature. In order to transmit over a longer distance without the need of repeaters, it is common to use a high power diode laser to launch a laser beam into the optical fiber. However, the high power laser beam used to carry information is usually invisible. In other words, the human eyes will be unable to sense the high power laser beam if it leaves from the open end of a fiber cable. Thus, it is required to obstruct the high power laser beam to avoid hurting the eyes when the laser beam leaves from an optical fiber.

Figure 1:
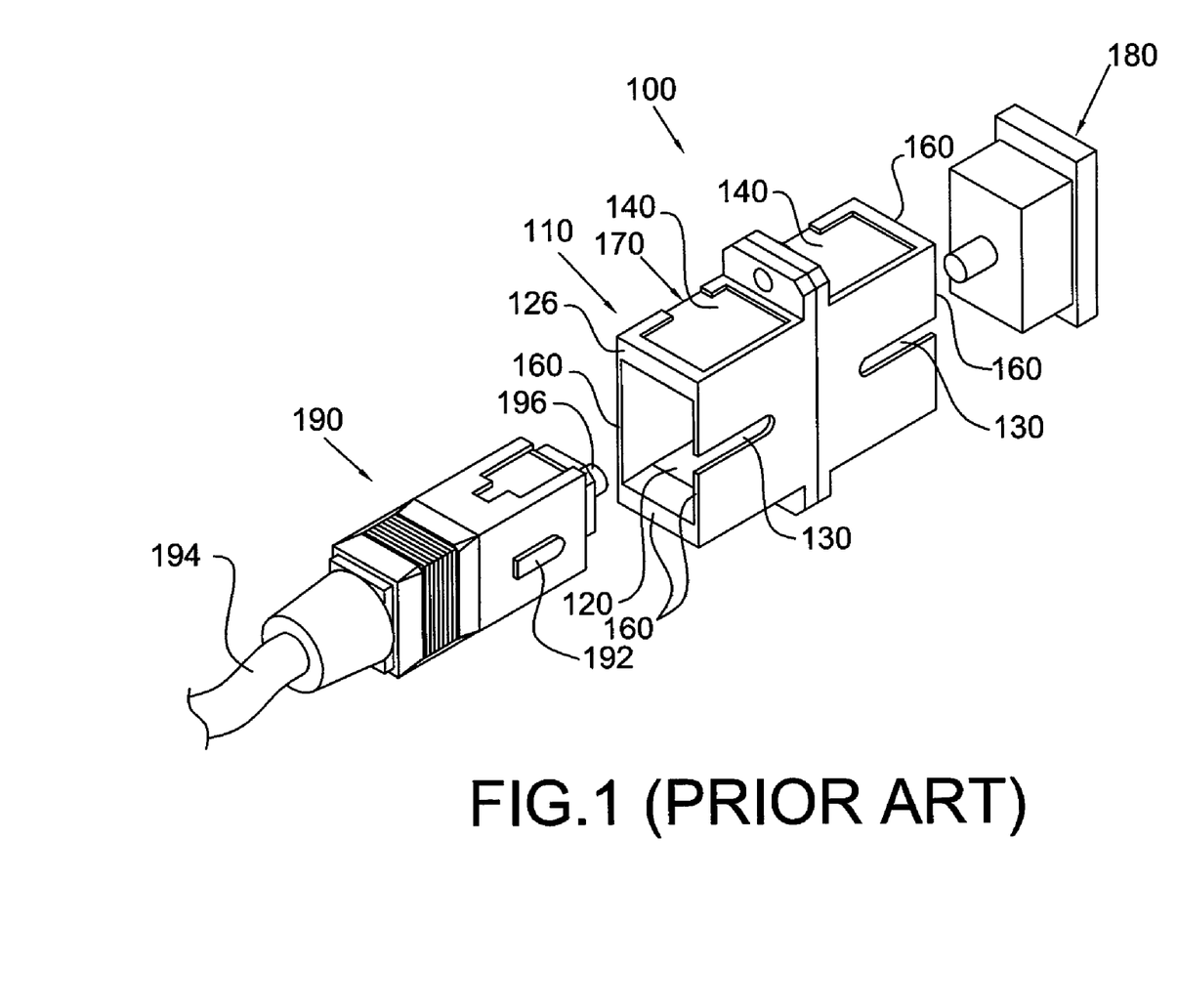
FIG. 1 is an elevated perspective view illustrating a conventional optical fiber adapter and a conventional optical fiber connector.

Referring to FIG. 1, a conventional fiber adapter 100 includes a housing 110 having a plurality of side walls 160. The side walls 160 define a receiving recess 120. One of the side walls 160 is provided with a slot 130 for mating with the key 192 of the connector 190 when the connector 190 is inserted into the receiving recess 120. In addition, the outer surfaces of two opposite side walls 160 are provided with recesses 140 that a clip (not shown in the figure) can be disposed thereon to facilitate the adapter 100 to be mounted on a panel.

When the adapter 100 is used to couple two connectors 190 together, the two connectors 190 are respectively inserted into the receiving recesses 120. The ferrules 196 of the connectors 190 thus slide into a hollow sleeve (not shown in the figure) and are brought into axial alignment and contact with each other. A light beam will be able to propagate from the fiber cable 194 of a connector 190 through the interface between the two ferrules 196 and then reach the fiber cable 194 of the other connector 190, and vice versa.

When one connector 190 is disconnected from the adapter 100, the light beam originally propagating from the connector 190 still kept in the adapter 100 to the presently disconnected connector 190 will now leave the ferrule 196 and emit from the receiving recess 120. If the emitted light beam is high power and not obstructed, a lasting exposure to such light beam is harmful to people, particularly to the eyes. Thus, to avoid exposing to the high-power light beam, it is common to use a cap 180 to block up the unused receiving recess 120. This can obstruct the light beam and also prevent the receiving recess 120 from dust. If a connector 190 would like to be mated with the adapter 100, the cap 180 is required to be removed. However, the cap 180 is apt to get lost and it is still possible to expose the eyes to the light beam during mating.

Figure 2:
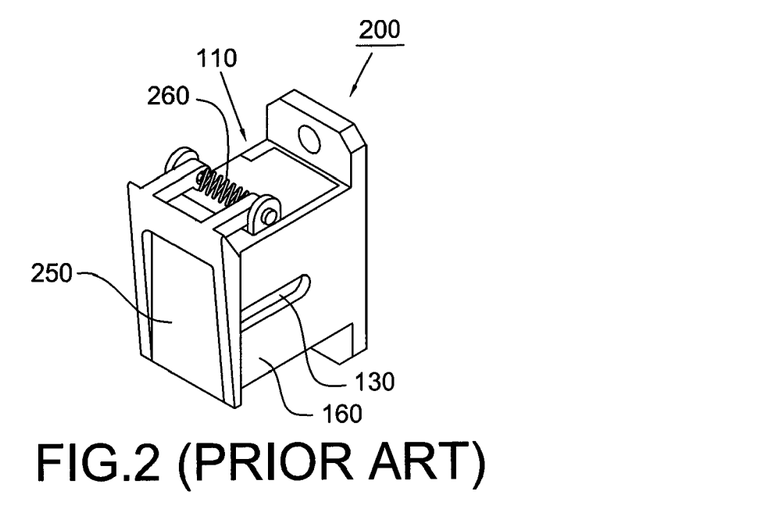
FIG. 2 is an elevated perspective view of a conventional optical fiber adapter with a cover for obstructing the light beam emitted from the receiving recess.

Referring to FIG. 2, a conventional fiber adapter 200 is generally the same as the adapter 100 but further includes a cover 250 pivotally connected to the housing 110. The cover 250 covers the receiving recess 120 in its closed position. A spring 260 can force the cover 250 to be pivoted to its closed position when the receiving recess 120 is not mated with a connector 190. Thus, the cover 250 is capable of obstructing the light beam emitted from the receiving recess 120 in its closed position. If a user would like to mate a connector 190 with the adapter 200, he is first required to lift the cover 250 from its closed position and then to insert the connector 190 into the receiving recess 120. Upon pulling out the connector 190, the cover 250 is pivoted to cover the receiving recess 120 through the spring 260. As a result, the user has no chance to expose to the high-power light beam. However, the construction of the adapter 200 is much more complex than that of the adapter 100.

Figure 3:
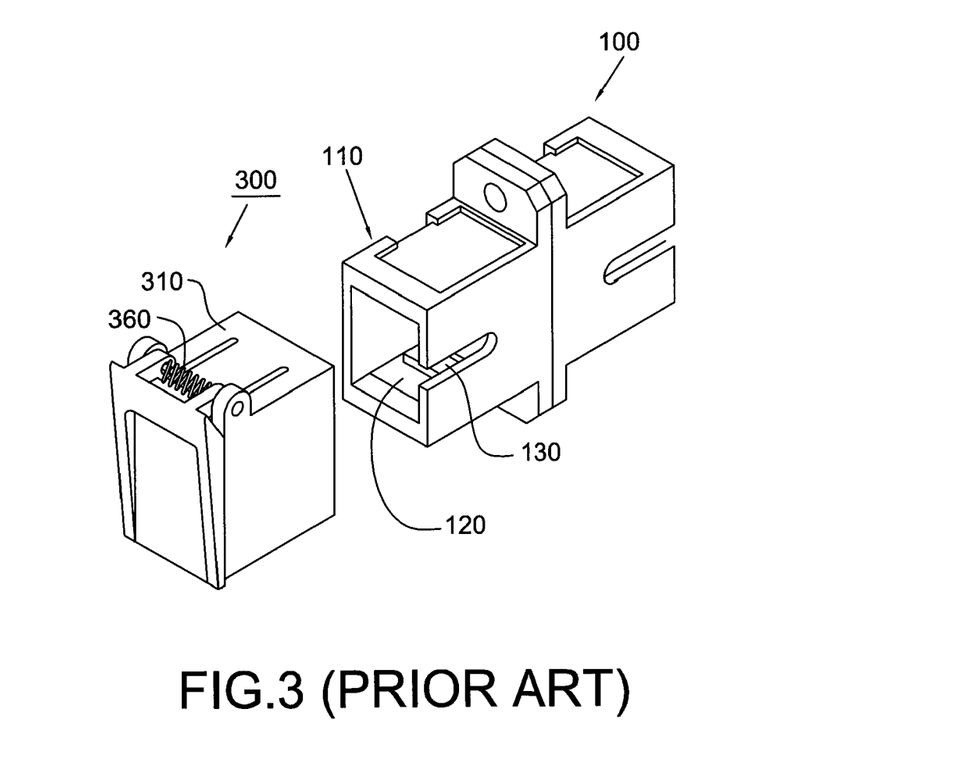
FIG. 3 is an elevated perspective view of a conventional protection cap for an optical fiber adapter.

Referring to FIG. 3, a conventional protection cap 300 for the fiber adapter 100 includes a hollow housing 310 with two opposing openings and a cover 350 pivotally connected to the housing 310. The cover 350 is pivoted to cover one of the two openings through a spring 360. The protection cap 300 can be put on the adapter 100 and cover the outer surfaces of the side walls 160 and the receiving recess 120 of the adapter 100. When a user would like to mate a connector 190 with the adapter 200, he is required to lift the cover 350 from its closed position and then to insert the connector 190 into the receiving recess 120. Likewise, upon pulling out the connector 190, the cover 350 is pivoted to cover the receiving recess 120 by the spring 360. As a result, the user has no chance to expose to the high-power light beam emitted from the receiving recess 120. However, the structure of the protection cap 300 is somewhat complex and therefore it is not inexpensive. The introduction of the protection cap 300 to obstruct the light beam will cost much.

Figure 4:
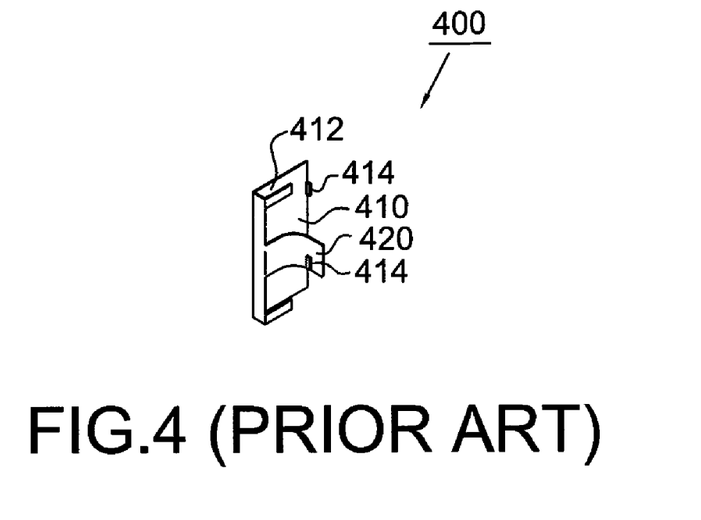
FIG. 4 is an elevated perspective view of a conventional shutter member for an optical fiber adapter.

Referring to FIG. 4, it illustrates a conventional shutter member 400 for the optical fiber adapter 100. The shutter member 400 includes a clamping portion 410. The one end of the clamping portion 410 has a clamping indentation 412 for attaching to one of the side walls 160 of the adapter 100 and the other opposite end of the clamping portion 410 has at least one hook 414. In addition, the shutter member 400 further includes a curved elastic shutter plate 420 extending from the clamping portion 410.

Figure 5:
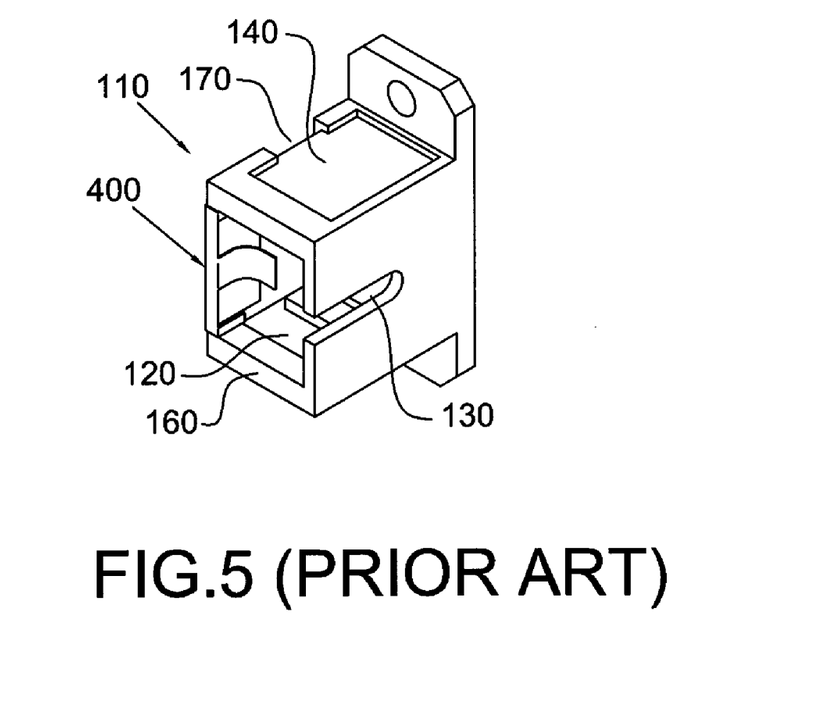
FIG. 5 is an elevated perspective view illustrating that the shutter member of FIG. 4 is attached to an optical fiber adapter.
Figure 6:
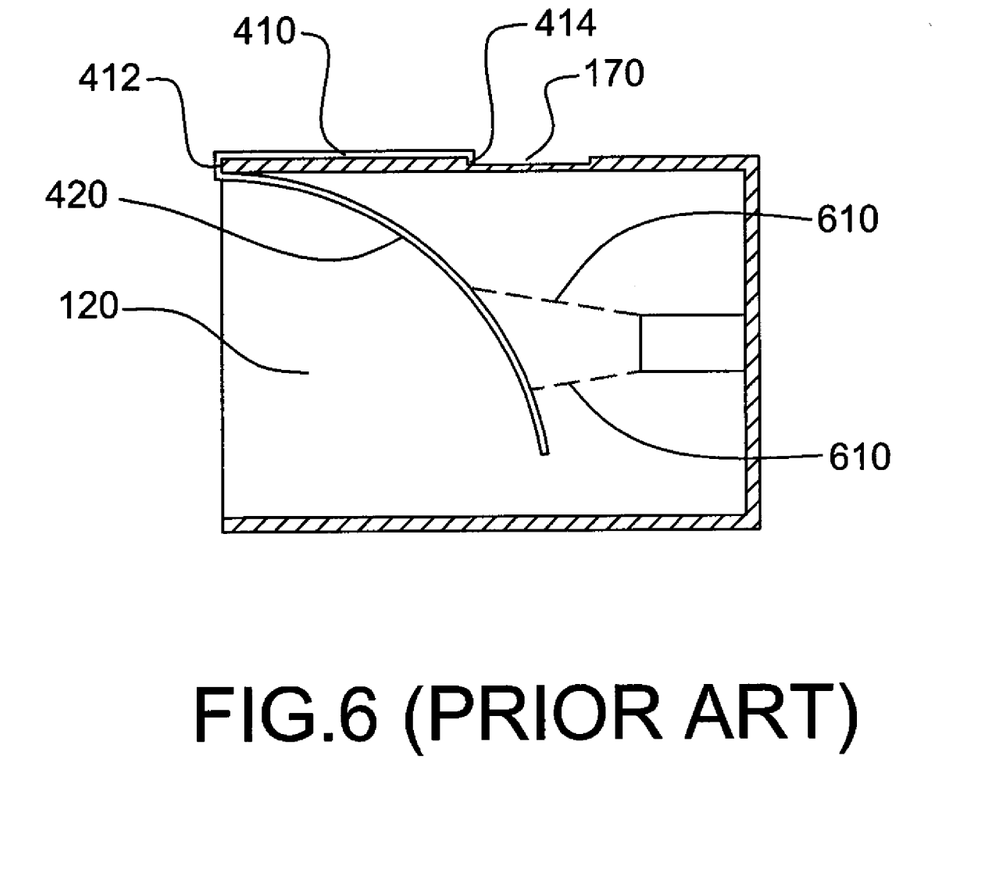
FIG. 6 is a sectional view illustrating that the shutter member of FIG. 4 is attached to an optical fiber adapter.

Referring to FIGS. 5 and 6, when the shutter member 400 is used in the adapter 100, the shutter plate 420 extends into the receiving recess 120 to obstruct the light beam 610 emitted therefrom. As a result, the occurrence of exposure to the harmful light beam 610 can be avoided. In addition, there is no need to detach the shutter member 400 from the adapter 100 prior to inserting the connector 190 into the receiving recess 120. When the connector 190 is inserted into the receiving recess 120, it will push down the elastic shutter plate 420 to the gap between the connector 190 and the side wall 160. Upon pulling out the connector 190, the elastic shutter plate 420 will quickly return to its original position to obstruct the light beam 610 as a result of elasticity.

However, when the shutter plate 420 is pushed down by the connector 190, it will experience a large deflection. Therefore, the shutter plate 420 is prone to undergo a plastic deformation.

Accordingly, there exists a need to provide an optical fiber adapter to solve the aforesaid problems.

SUMMARY OF THE INVENTION

The present invention provides a shutter member for an optical fiber adapter that can obstruct the light beam emitted from the accommodation room and therefore prevent the eyes from exposure to the light beam.

The optical fiber adapter of the present invention has two same accommodation portions located at the two opposite ends thereof, respectively. Each of the accommodation portions has a first accommodation room, a second accommodation room, a plurality of side walls and a partition wall. The first and second accommodation rooms are adjacent to each other and separated by the partition wall. Three side walls and the partition wall define the first accommodation room. The second accommodation room is also defined by the three side walls and the partition wall. The first and second accommodation rooms can couple with optical fiber connectors. Two opposite protrusions in the first accommodation room are disposed on the partition wall and the opposite side wall, respectively.

The shutter member for the optical fiber adapter according to the present invention includes a first parallel portion, a second parallel portion, and a connecting portion connecting the first and second parallel portions. The first parallel portion is substantially parallel to the second parallel portion. The first and second parallel portions and the connecting portion together define a clamping portion. An elastic shutter plate extends from one end of the first parallel portion. The shutter member further includes an elastic sheet connecting to the second parallel portion. At least one protrusion portion protrudes from one end of the second parallel portion.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 7:
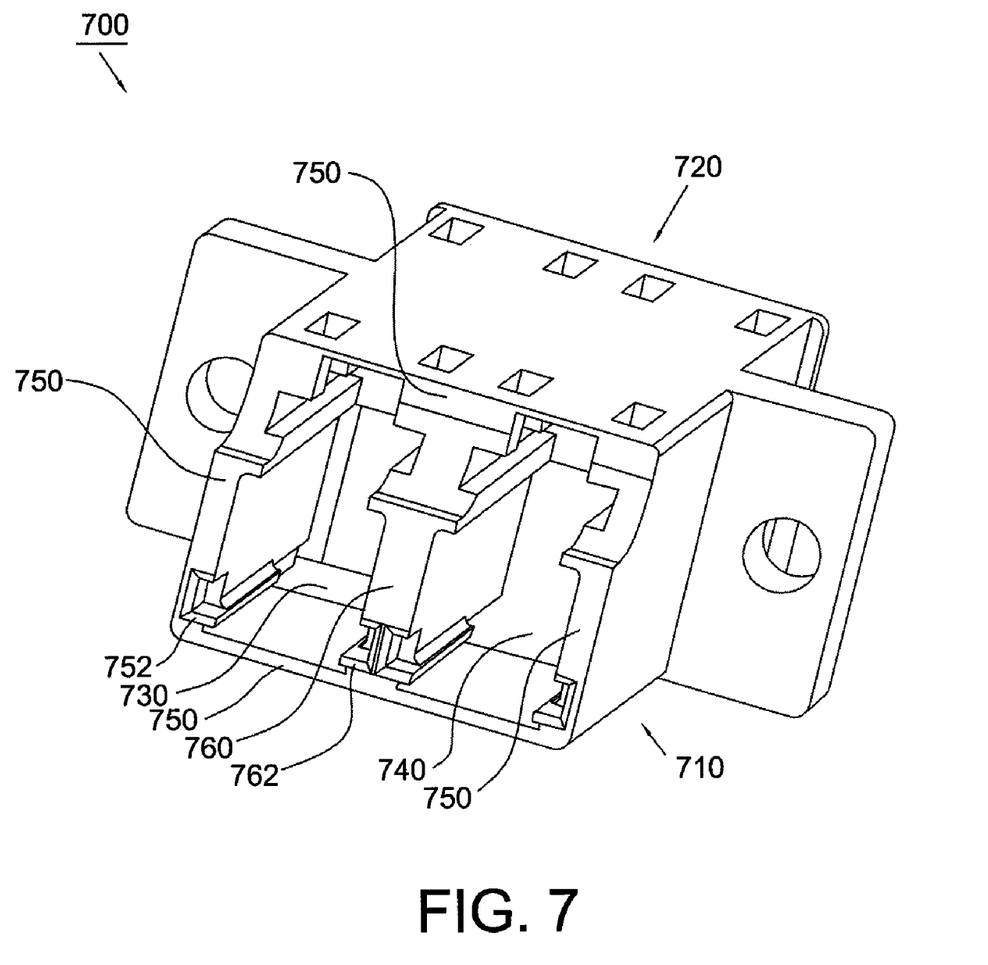
FIG. 7 is an elevated perspective view of the optical fiber adapter of the present invention.

Referring to FIG. 7, the optical fiber adapter 700 of the present invention has two same accommodation portions 710 and 720 located at the two opposite ends thereof, respectively. The accommodation portion 710 has a first accommodation room 730, a second accommodation room 740, a plurality of side walls 750 and a partition wall 760. The first and second accommodation rooms 730, 740 are adjacent to each other and separated by the partition wall 760. Furthermore, as shown in the figure, the three side walls 750 and the partition wall 760 together define the first accommodation room 730. Similarly, the second accommodation room 740 is also defined by the three side walls 750 and the partition wall 760. The first and second accommodation rooms 730, 740 can couple with optical fiber connectors, respectively. In addition, two opposite protrusions 762 and 752 in the first accommodation room 730 are disposed on the partition wall 760 and the opposite side wall 750, respectively.

Figure 8:
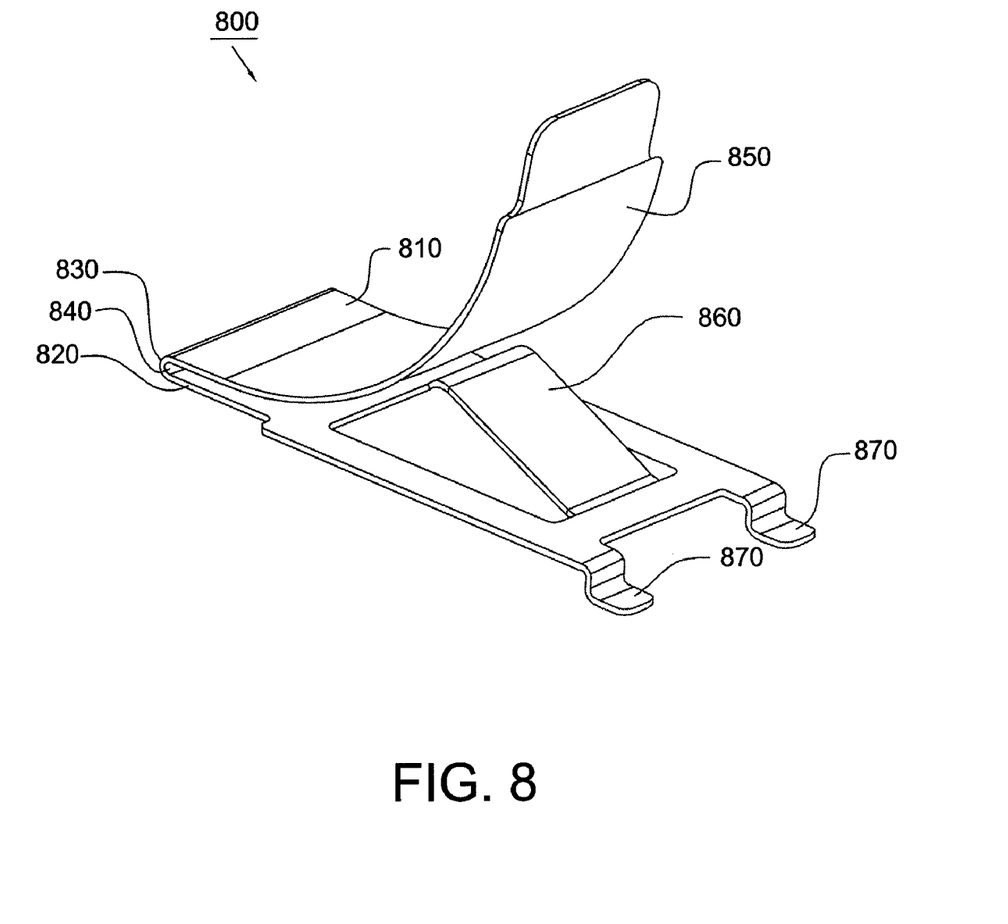
FIG. 8 is an elevated perspective view of the shutter member of the present invention.

Referring to FIG. 8, the shutter member 800 for the optical fiber adapter 700 according to the present invention includes a first parallel portion 810, a second parallel portion 820, and a connecting portion 830 connecting the first and second parallel portions 810, 820. The first parallel portion 810 is substantially parallel to the second parallel portion 820. The first and second parallel portions 810, 820 and the connecting portion 830 together define a clamping portion 840. In addition, an elastic shutter plate 850 extends from one end of the first parallel portion 810, wherein the angle between them is greater than 140 degrees. The shutter member 800 further includes an elastic sheet 860 connecting to the second parallel portion 820. At least one, such as two protrusion portions 870 protrude from one end of the second parallel portion 820.

Figure 9:
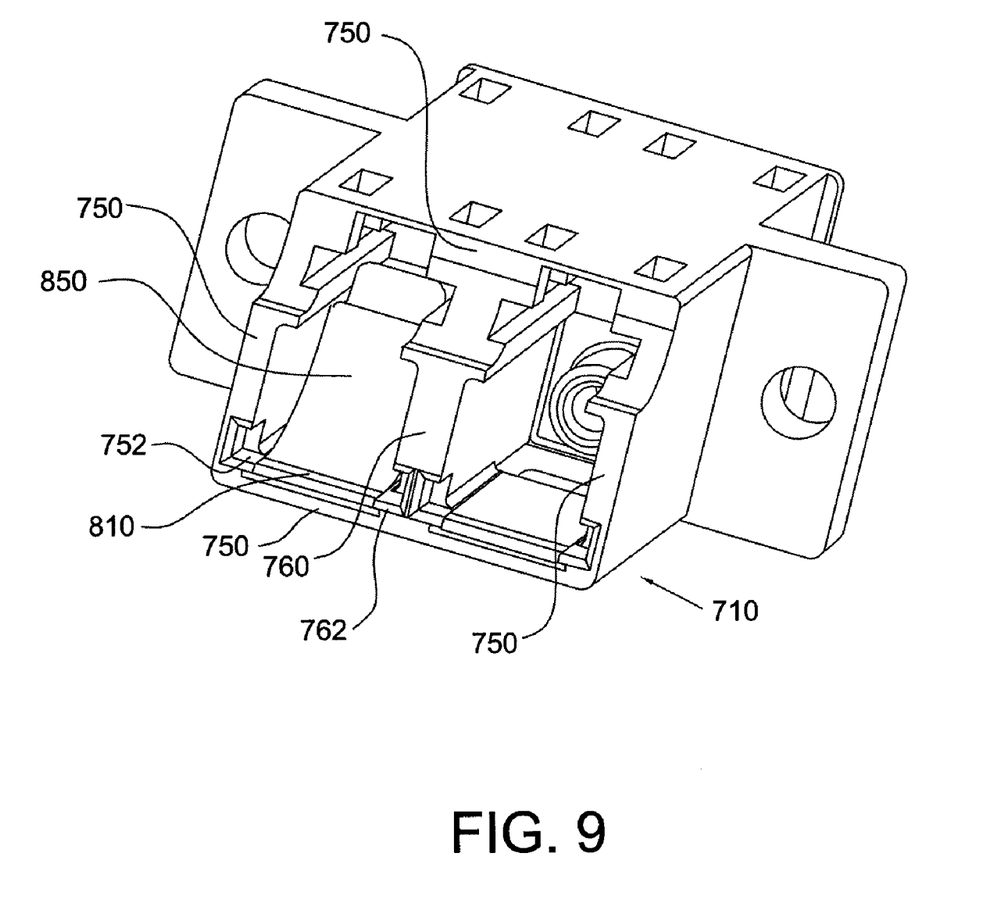
FIG. 9 is an elevated perspective view illustrating that the shutter member of FIG. 8 is attached to the optical fiber adapter of FIG. 7.
Figure 10:
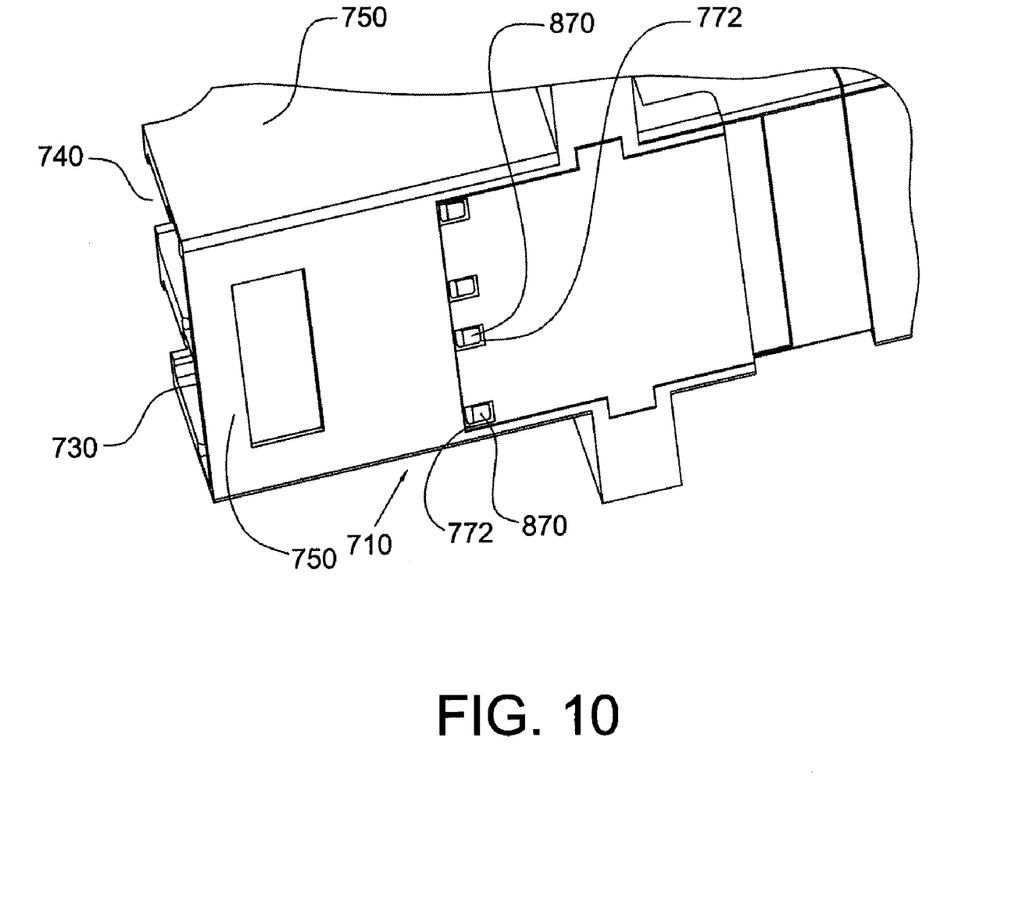
FIG. 10 is an elevated perspective view illustrating that the shutter member of FIG. 8 is attached to the optical fiber adapter of FIG. 7, wherein the protrusion portion of the shutter member of FIG. 8 protrudes outside the accommodation room from the opening on the side wall of the optical fiber adapter.

Referring to FIG. 9, when the shutter member 800 is used in the adapter 700, the clamping portion 840 clamps the protrusions 752 and 762. The elastic shutter plate 850 can therefore extends into the accommodation room 730 to obstruct the light beam emitted therefrom. As a result, the occurrence of exposure to the harmful light beam can be avoided. In addition, there is no need to detach the shutter member 800 from the adapter 700 prior to inserting a connector into the accommodation room 730. When the connector is inserted into the accommodation room 730, it will push down the elastic shutter plate 850 to the gap between the connector and the side wall 750. Upon pulling out the connector, the elastic shutter plate 850 will quickly spring up to obstruct the light beam as a result of elasticity. Moreover, since the elastic sheet 860 will also spring up when the connector is pulled out, the elastic sheet 860 can push the shutter plate 850 back to its original position. Referring to FIG. 10, in order to allow the shutter member 800 to more securely attach to the adapter 700, at least one opening 772 is formed on the side wall 750 so that the protrusion portion 870 can protrude outside the accommodation room 730 from the opening 772 when the shutter member 800 is attached to the adapter 700.

The shutter member 800 can be integrally formed and made of metal. Moreover, it is to be noted that since the shutter member 800 has the first parallel portion 810 and the shutter plate 850 extends from the first parallel portion 810, the shutter plate 850 will be deflected only at most 40 degrees when a connector is inserted into the accommodation room 730. The deflection is not large and therefore the shutter plate 850 is not prone to undergo a plastic deformation It will be appreciated that although the invention has been explained with duplex adapters, the shutter member of the present invention can be used in simplex or other types of adapters.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical fiber adapter, comprising:
a plurality of walls which define an accommodation room adapted for being coupled with an optical fiber connector, wherein the plurality of walls comprise at least a first wall and a second wall opposite to the first wall;
a first protrusion disposed on the first wall and in the accommodation room; and
a shutter member including:
   a first parallel portion;
   a second parallel portion substantially parallel to the first parallel portion, the second parallel portion being positioned within the accommodation room;
   a connecting portion connecting the first and second parallel portions, wherein the first and second parallel portions and the connecting portion together define a clamping portion, the clamping portion clamps the first protrusion; and
   an elastic shutter plate extending from the first parallel portion and into the accommodation room.

2. The optical fiber adapter as claimed in claim 1, further comprising:
a second protrusion opposite to the first protrusion, disposed on the second wall, wherein the clamping portion clamps the second protrusion.

3. The optical fiber adapter as claimed in claim 2, wherein the second protrusion is positioned within the accommodation room.

4. The optical fiber adapter as claimed in claim 1, wherein
the accommodation room has an entrance through which the optical fiber connector is inserted into the accommodation room,
at least one opening other than the entrance is formed through one of the plurality of walls, and
the shutter member further comprises:
   at least one protrusion portion protruding from the second parallel portion, wherein the protrusion portion protrudes from within the accommodation room to an outside of the accommodation room through the opening.

5. The optical fiber adapter as claimed in claim 1, wherein the angle between the shutter plate and the first parallel portion is greater than 140 degrees.

6. The optical fiber adapter as claimed in claim 1, wherein the shutter member is integrally formed and made of metal.

7. The optical fiber adapter as claimed in claim 1, further comprising:
an elastic sheet connecting to the second parallel portion, and adapted to push the elastic shutter plate toward an original position of said elastic shutter plate.

8. A shutter member for an optical fiber adapter, the optical fiber adapter having a plurality of walls and a protrusion disposed on one of the walls, wherein the walls define an accommodation room adapted for being coupled with an optical fiber connector, the protrusion is disposed in the accommodation room, the shutter member comprises:
a first parallel portion;
a second parallel portion substantially parallel to the first parallel portion;
a connecting portion connecting the first and second parallel portions, wherein the first and second parallel portions and the connecting portion together define a clamping portion, the clamping portion is adapted for clamping the protrusion, and wherein the second parallel portion is positioned within the accommodation room when the clamping portion clamps the protrusion of the optical fiber adapter; and
an elastic shutter plate extending from the first parallel portion, wherein the shutter plate extends into the accommodation room when the clamping portion clamps the protrusion of the optical fiber adapter.

9. The shutter member as claimed in claim 8, wherein the accommodation room has an entrance through which the optical fiber connector is inserted into the accommodation room, at least one opening other than the entrance is formed through one of the walls, the shutter member further comprises:
at least one protrusion portion protruding from the second parallel portion, wherein the protrusion portion protrudes from within the accommodation room to an outside of the accommodation room through the opening when the clamping portion clamps the protrusion of the optical fiber adapter.

10. The shutter member as claimed in claim 8, wherein the angle between the shutter plate and the first parallel portion is greater than 140 degrees.

11. The shutter member as claimed in claim 8, wherein the shutter member is integrally formed and made of metal.

12. The shutter member as claimed in claim 8, further comprising:
an elastic sheet connecting to the second parallel portion, and adapted to push the elastic shutter plate toward an original position of said elastic shutter plate.

13. An optical fiber adapter, comprising:
a plurality of walls which define an accommodation room adapted for being coupled with an optical fiber connector, wherein the plurality of walls comprise at least a first wall and a second wall opposite to the first wall;
a first protrusion disposed on the first wall and in the accommodation room; and
a shutter member including:
   a first parallel portion;
   a second parallel portion substantially parallel to the first parallel portion;
   a connecting portion connecting the first and second parallel portions, wherein the first and second parallel portions and the connecting portion together define a clamping portion, the clamping portion clamps the first protrusion; and
   an elastic shutter plate extending from the first parallel portion and into the accommodation room, wherein the angle between the shutter plate and the first parallel portion is greater than 140 degrees.

* * * * *